United States Patent
Hwang et al.

(10) Patent No.: US 8,280,239 B2
(45) Date of Patent: Oct. 2, 2012

(54) DIGITAL IMAGE PHOTOGRAPHING APPARATUS, METHOD OF CONTROLLING THE APPARATUS, AND RECORDING MEDIUM HAVING PROGRAM FOR EXECUTING THE METHOD

(75) Inventors: Kyu-ern Hwang, Changwon (KR); O-hyun Kwon, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 673 days.

(21) Appl. No.: 12/365,204

(22) Filed: Feb. 4, 2009

(65) Prior Publication Data

US 2009/0195689 A1 Aug. 6, 2009

(30) Foreign Application Priority Data

Feb. 5, 2008 (KR) .......................... 10-2008-0011971

(51) Int. Cl.
*G03B 13/34* (2006.01)
(52) U.S. Cl. ............................ 396/95; 348/345; 396/125
(58) Field of Classification Search .................. 348/349, 348/352, 345; 396/124, 95, 125
See application file for complete search history.

(56) References Cited

U.S. PATENT DOCUMENTS

| 6,327,436 | B2 * | 12/2001 | Kawabe et al. ............... 396/121 |
| 7,136,581 | B2 * | 11/2006 | Fujii ............................... 396/54 |
| 2004/0165879 | A1 * | 8/2004 | Sasaki et al. .................. 396/137 |
| 2005/0264679 | A1 * | 12/2005 | Sasaki et al. .................. 348/345 |
| 2008/0002028 | A1 * | 1/2008 | Miyata .......................... 348/169 |
| 2008/0036861 | A1 * | 2/2008 | Yamamoto .................... 348/143 |
| 2008/0181457 | A1 * | 7/2008 | Chattopadhyay et al. .... 382/103 |
| 2009/0096898 | A1 * | 4/2009 | Sambongi ..................... 348/254 |
| 2009/0109321 | A1 * | 4/2009 | Takeuchi et al. .............. 348/345 |
| 2010/0013977 | A1 * | 1/2010 | Suzuki ..................... 348/333.11 |
| 2010/0045800 | A1 * | 2/2010 | Chebil et al. .................. 348/169 |
| 2010/0128146 | A1 * | 5/2010 | Nojima .................... 348/231.99 |

* cited by examiner

*Primary Examiner* — Clayton E Laballe
*Assistant Examiner* — Linda B Smith
(74) *Attorney, Agent, or Firm* — Drinker Biddle & Reath LLP (57) ABSTRACT

Provided are a digital image photographing apparatus which easily captures an image of a composition intended by a user, a method of controlling the apparatus, and a recording medium having a program for executing the method. The apparatus includes: an image capturing device for receiving light to generate data on an image; and an auto-focusing tracking unit for allowing a lens to be auto-focused on a subject selected by a user. The image capturing device generates data on a still image when the subject on which the lens is auto-focused is located in a predetermined region of interest (ROI).

19 Claims, 8 Drawing Sheets

DIGITAL IMAGE PHOTOGRAPHING
APPARATUS, METHOD OF CONTROLLING
THE APPARATUS, AND RECORDING
MEDIUM HAVING PROGRAM FOR
EXECUTING THE METHOD

CROSS-REFERENCE TO RELATED PATENT
APPLICATION

This application claims the benefit of Korean Patent Application No. 10-2008-0011971, filed on Feb. 5, 2008, in the Korean Intellectual Property Office, the disclosure of which is incorporated herein in its entirety by reference.

BACKGROUND

1. Field of the Invention

The present invention relates to a digital image photographing apparatus, a method of controlling the apparatus, and a recording medium having a program for executing the method, and more particularly, to a digital image photographing apparatus capable of capturing an image of a composition intended by a user, a method of controlling the apparatus, and a recording medium having a program for executing the method.

2. Description of the Related Art

In general, digital image photographing apparatuses store image data obtained by capturing images in a photographing mode (or a live-view mode) in a storage medium, and display images corresponding to the image data stored in the storage medium, on a display unit. In addition, digital image photographing apparatuses may reproduce images corresponding to the image data obtained by capturing images in the photographing mode. Also, in the photographing mode, a real-time moving image (or a live-view image) of image data obtained by light incident on an image capturing device and converted into image data is displayed on the display unit until an image is captured in response to a user's input signal.

The increase in use of digital image photographing apparatuses has led to a strong demand for high-quality images. However, the instant a user finally presses a shutter of a conventional digital image processing apparatus to capture an image, the digital image photographing apparatus may move slightly, thereby degrading the resolution of the captured image. Also, when photographing a subject moving rapidly, it is difficult to capture an image of the subject and compose the image satisfactorily. Furthermore, when a user asks another person to capture an image, it is not easy to capture an image of a composition intended by the user.

SUMMARY

The present invention provides a digital image photographing apparatus which can easily capture an image of a composition intended by a user, a method of controlling the apparatus, and a recording medium having a program for executing the method.

According to an aspect of the present invention, there is provided a digital image photographing apparatus including: an image capturing device for receiving light to generate data on an image; and an auto-focusing tracking unit for allowing a lens to be auto-focused on a subject selected by a user. In the apparatus, the image capturing device generates data on a still image when the subject on which the lens is auto-focused is located in a predetermined region of interest (ROI).

Even if the location of the subject selected by the user is changed, the auto-focusing tracking unit may allow the lens to remain auto-focused on the subject selected by the user.

The image capturing device may generate the data on the still image when the center of the predetermined ROI coincides with the center of the subject on which the lens is auto-focused.

The auto-focusing tracking unit may recognize a subject, which is located at an auto-focusing mark (AFM) when the user half presses a shutter, as the subject selected by the user.

A plurality of ROIs may be previously set, and when the subject selected by the user is located in one of the previously set ROIs, the image capturing device may generate the data on the still image.

A plurality of ROIs may be previously set, and whenever the subject selected by the user is located in one of the ROIs by moving the digital image photographing apparatus or the subject selected by the user, the image capturing device may generate the data on the still image.

According to another aspect of the present invention, there is provided a method of controlling a digital image photographing apparatus. The method includes: setting an ROI in response to a signal input by a user; determining a subject on which a lens is auto-focused, in response to the signal input by the user; and obtaining data on a still image when the subject on which the lens is auto-focused is located in the set ROI.

When the subject on which the lens is auto-focused is determined, even if the location of the subject on which the lens is auto-focused is changed, the lens may continuously remain auto-focused on the subject.

The data on the still image may be obtained when the center of the set ROI coincides with the center of the subject on which the lens is auto-focused.

The determination of the subject on which the lens is auto-focused may include determining a subject, which is located at an AFM when the user half presses a shutter, as the subject on which the lens is auto-focused.

A plurality of ROIs may be set, and the data on the still image may be obtained when the subject on which the lens is auto-focused is located in one of the plurality of ROIs.

A plurality of ROIs may be set, and the data on the still image may be obtained whenever the subject selected by the user is located in one of the ROIs by moving the digital image photographing apparatus or the subject selected by the user.

According to another aspect of the present invention, there is provided a computer-readable medium having embodied thereon a computer program for executing the method of controlling the digital image photographing apparatus.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
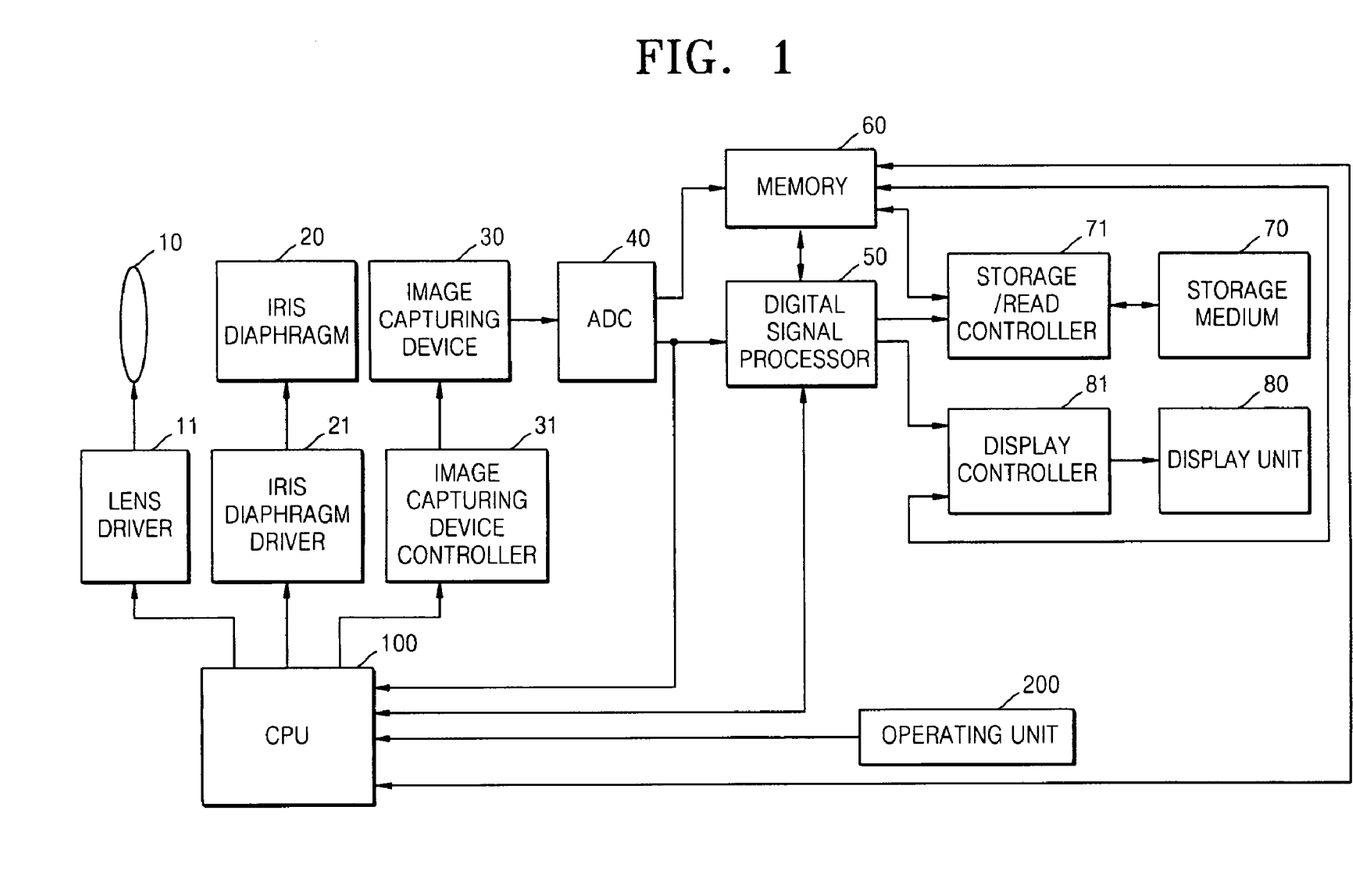
FIG. 1 is a block diagram of a digital image photographing apparatus according to an exemplary embodiment of the present invention.

FIG. 1 is a block diagram of a digital image photographing apparatus according to an exemplary embodiment of the present invention.

Referring to FIG. 1, the digital image photographing apparatus according to the current embodiment includes a central processing unit (CPU) 100 and an operating unit 200. The entire operation of the digital image photographing apparatus is controlled by the CPU 100. The operating unit 200 has a key for generating an electric signal in response to manipulation of the key by a user. The electric signal generated in the operating unit 200 is transmitted to the CPU 100 so that the CPU 100 may control the digital image photographing apparatus in response to the electric signal.

In a photographing mode, when the electric signal is transmitted from the operating unit 200 to the CPU 100, the CPU 100 controls a lens driver 11, an iris diaphragm driver 21, and an image capturing device controller 31 in response to the electric signal. Thus, the position of a lens 10, an aperture of an iris diaphragm 20, and the sensitivity of an image capturing device 30 are controlled. The image capturing device 30 receives light and converts the light into image data. If the image data generated by the image capturing device 30 is analog image data, an analog-to-digital converter (ADC) 40 receives the image data from the image capturing device 30 and converts the image data into digital data. The ADC 40 may be omitted according to the characteristics of the image capturing device 30.

The image data generated by the image capturing device 30 may be input to a digital signal processor 50 via a memory 60 or directly input to the digital signal processor 50 without passing through the memory 60. Also, the image data generated by the image capturing device 30 may be input to the CPU 100 if required. Here, the memory 60 may be a read-only memory (ROM) or a random access memory (RAM). The digital signal processor 50 may perform digital signal processing on the image data, such as gamma encoding and white balancing, if required.

Image data output by the digital signal processor 50 is transmitted to a display controller 81 via the memory 60 or directly transmitted to the display controller 81 without passing through the memory 60. The display controller 81 may control a display unit 80 and displays an image corresponding to the image data on the display unit 80. Also, the image data output by the digital signal processor 50 may be input to a storage/read controller 71 via the memory 60 or directly input to the storage/read controller 71 without passing through the memory 60. The storage/read controller 71 stores image data in a storage medium 70 in response to a signal input by a user or automatically. Of course, the storage/read controller 71 may read image data from an image file stored in the storage medium 70 and input the image data to the display controller 81 via the memory 60 or another path so that an image may be displayed on the display unit 80. The storage medium 70 may be detachably installed or permanently mounted on the digital image photographing apparatus.

The digital image photographing apparatus according to the present embodiment may include an auto-focusing tracking unit (not shown) for auto-focusing the lens 10 on a subject selected by a user. The auto-focusing tracking unit may be a portion of the digital signal processor 50, a portion of the CPU 100, or another component separated from the digital signal processor 50 or the CPU 100. That is, the auto-focusing tracking unit may be variously changed.

In the digital image photographing apparatus according to the present embodiment, when a subject on which the lens 10 is auto-focused is located in a predetermined region of interest (ROI), the image capturing device 30 generates data on a still image. Operation of the digital image photographing apparatus illustrated in FIG. 1 will now be described with reference to FIGS. 2A and 2B, which illustrate positional relationships between the predetermined ROI and the subject on which the lens 10 is auto-focused.

Figure 2A:
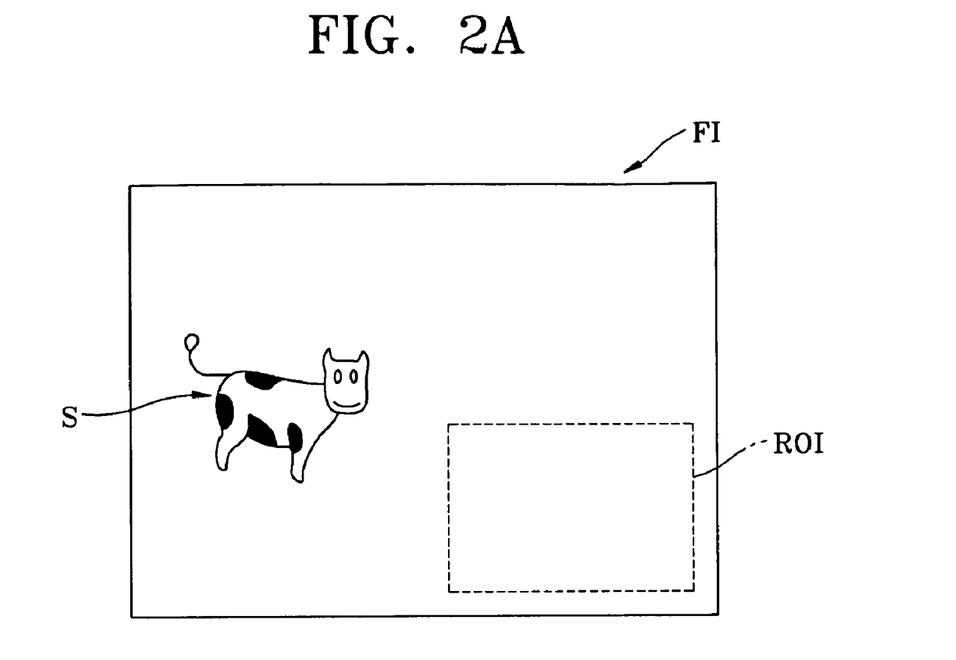
FIGS. 2A and 2B are pictorial diagrams illustrating positional relationships between a predetermined region of interest (ROI) and a subject on which a lens is auto-focused, for explaining an operation of the digital image photographing apparatus illustrated in FIG. 1.
Figure 2B:
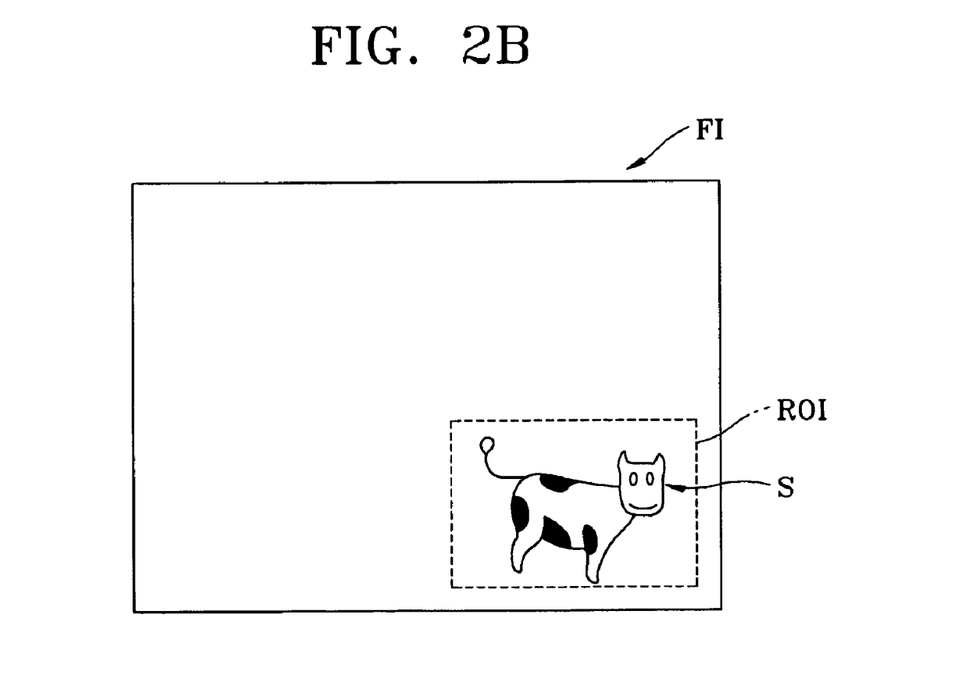

FIGS. 2A and 2B are conceptual diagrams of a frame image FI. Specifically, in the photographing mode, the digital image photographing apparatus according to the present embodiment may display a real-time moving image (or a live-view image) of image data obtained by light being incident on the image capturing device 30 and converted into image data on the display unit 80 until an image is captured in response to a user's input signal. Thus, FIGS. 2A and 2B show a frame image FI of the real-time moving image.

Referring to FIG. 2A, when a subject S that is selected by a user and on which the lens 10 is auto-focused is not located in a predetermined ROI, the digital image photographing apparatus according to the present embodiment does not obtain data on a still image. In this case, the auto-focusing tracking unit allows the lens 10 to be auto-focused on the subject S selected by the user. Specifically, when the digital image photographing apparatus according to the present embodiment is moved by the user or the subject S selected by the user is moved, while the subject S selected by the user is not located in the predetermined ROI, the auto-focusing tracking unit may enable the lens 10 to remain auto-focused on the subject S selected by the user.

Thereafter, as shown in FIG. 2B, when the selected subject S is located in the predetermined ROI, the image capturing device 30 generates data on a still image. Here, the still image refers to final image data other than the frame image FI of the real-time moving image (or the live-view image) of image data obtained by light incident on the image capturing device 30 on the display unit 80 until an image is captured in response to a user's input signal.

In a conventional digital image photographing apparatus, a user needs to finally press a shutter in order to obtain data on an image. In this case, the instant the user finally presses the shutter of the digital image photographing apparatus, the digital image photographing apparatus may be moved slightly, thereby degrading the resolution of a captured image. However, in the digital image photographing apparatus according to the present embodiment, even if a user does not finally press a shutter, when the subject S on which the lens 10 is auto-focused is located in the predetermined ROI, data on a still image may be automatically obtained so as to effectively overcome the above-described conventional problem. Also, when the conventional image photographing apparatus is used to photograph a subject moving rapidly, it is difficult to capture an image of the subject and compose the image as a user intends.

However, in the digital image photographing apparatus according to the present embodiment, when the subject S on which the lens 10 is auto-focused is located in the predetermined ROI, data on a still image may be automatically obtained. Accordingly, even if the subject S moves rapidly, when the subject S is located in the predetermined ROI, a still image of desired composition can be easily captured. Furthermore, when a user asks another person to photograph the subject S, when the subject S is located in the predetermined ROI, a still image of composition intended by a user can be captured.

The digital image photographing apparatus may be set to obtain data on a still image when the center of the predetermined ROI coincides with the center of the subject S on which the lens 10 is auto-focused. Alternatively, the digital image photographing apparatus may be set to obtain data on the still image when the subject S on which the lens 10 is auto-focused overlaps the predetermined ROI by a predetermined rate or higher. Also, when the subject S on which the lens 10 is auto-focused is located in the predetermined ROI, the display unit 80 or a view-finder (not shown) may perform an additional function to change the color of the ROI and display the ROI with the changed color so that a user may easily recognize if data on a still image is obtained.

Figure 3:
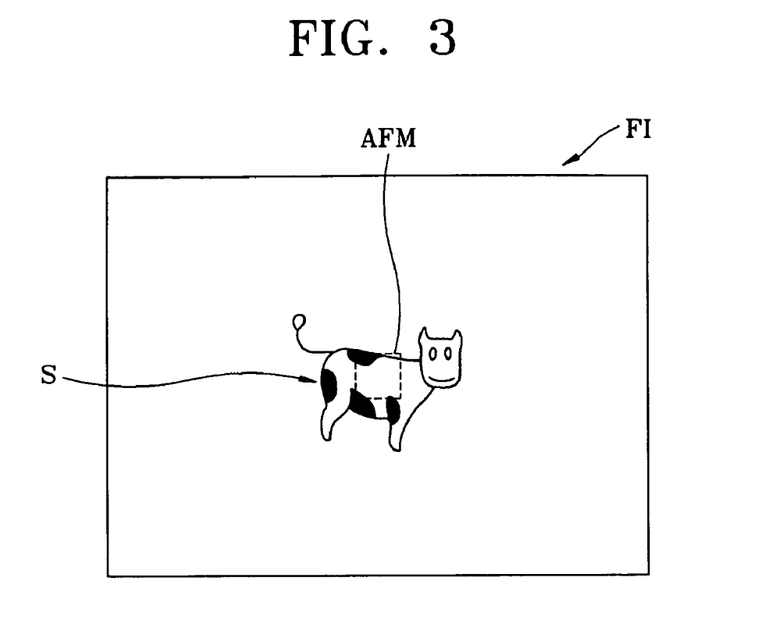
FIG. 3 is a pictorial diagram for explaining a process of determining a subject on which a lens is auto-focused.

FIG. 3 is a conceptual diagram for explaining a process of determining the subject S on which the lens 10 is auto-focused.

As described above, the digital image photographing apparatus according to the present embodiment needs to determine the subject S on which the lens 10 is auto-focused due to the fact that data on the still image is obtained when the determined subject S is located in the ROI. The subject S on which the lens 10 is auto-focused may be determined using various methods. For example, the subject S on which the lens 10 is auto-focused may be determined using an auto-focusing mark (AFM) as shown in FIG. 3. In other words, the digital image photographing apparatus may determine the subject S on which the lens 10 is auto-focused, by displaying or indicating a mark to be auto-focused on the display unit 80 or the view-finder. Specifically, a subject located at the AFM when the shutter is half pressed is recognized as a subject S selected by a user. Thus, when the subject S is located in the ROI later, data on a still image may be automatically obtained. Although it is illustrated in FIG. 3 that the AFM is located in the center of the frame image F1, a user may locate the AFM in a portion of the frame image F1 other than the center thereof. Alternatively, one of a plurality of AFMs may be selected by a user and employed to determine the subject S on which the lens 10 is auto-focused. The present invention is not limited thereto, and the use of the AFM may be variously changed.

When the subject located at the AFM when the shutter is half-pressed is recognized as the subject S selected by the user, while the user is half-pressing the shutter, the subject located at the AFM may continuously remain recognized as the subject S selected by the user. In this case, when the user releases the shutter, the digital image photographing apparatus may return to an initial mode where the subject S is not yet selected by the user.

In another case, after the subject located at the AFM when the shutter is half-pressed is recognized as the subject S selected by the user, even if the user releases the shutter, the subject located at the AFM may remain recognized as the subject S selected by the user. Thus, when the user half-presses the shutter later, the digital image photographing apparatus may return to an initial mode where the subject S is not yet selected by the user.

Figure 4A:
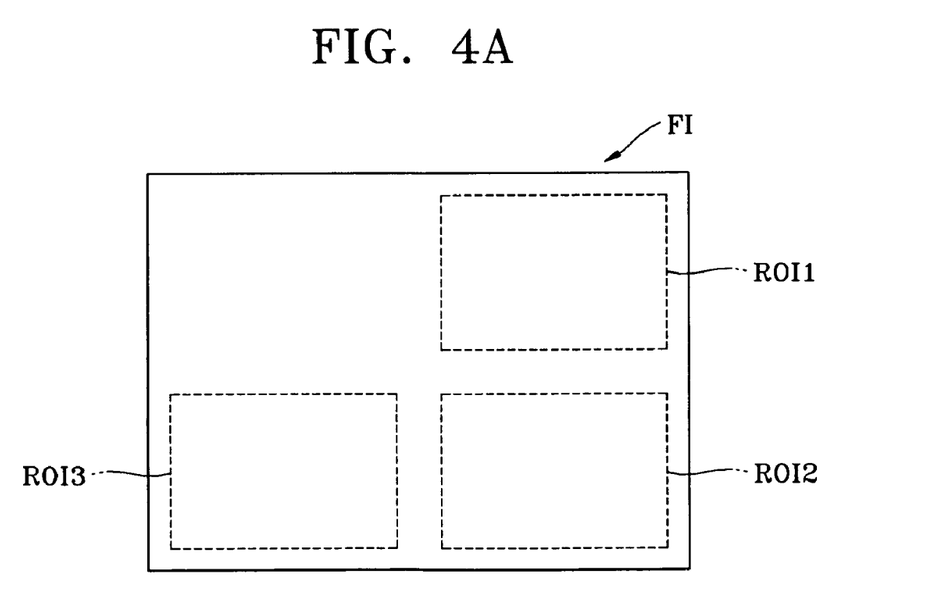
FIG. 4A is a pictorial diagram illustrating that a plurality of ROIs are set.
Figure 4B:
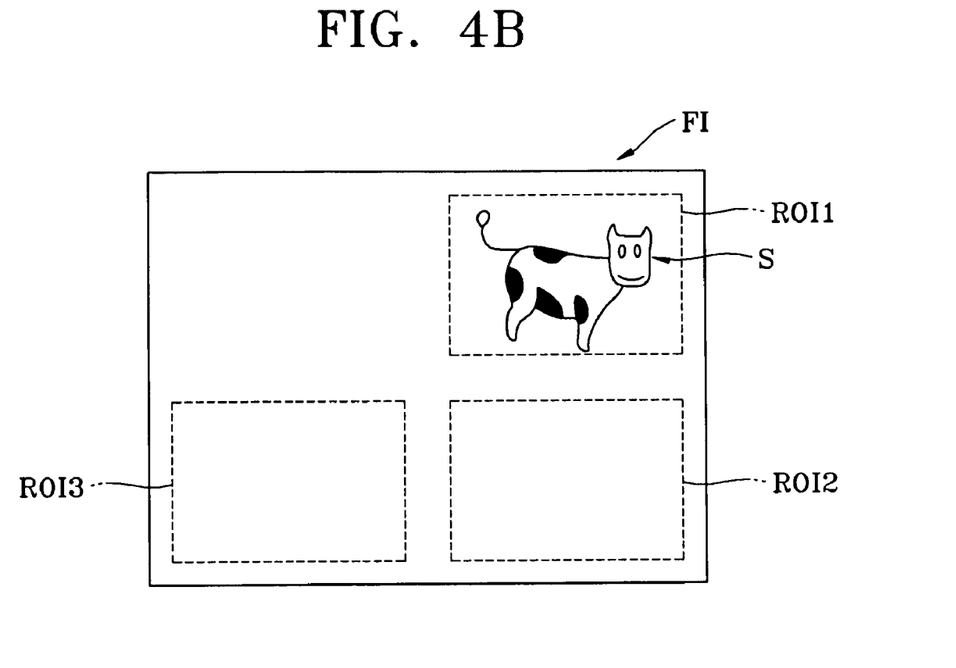
FIGS. 4B through 4D are pictorial diagrams illustrating positional relationships between the ROIs illustrated in FIG. 4A and a subject on which a lens is auto-focused.
Figure 4C:
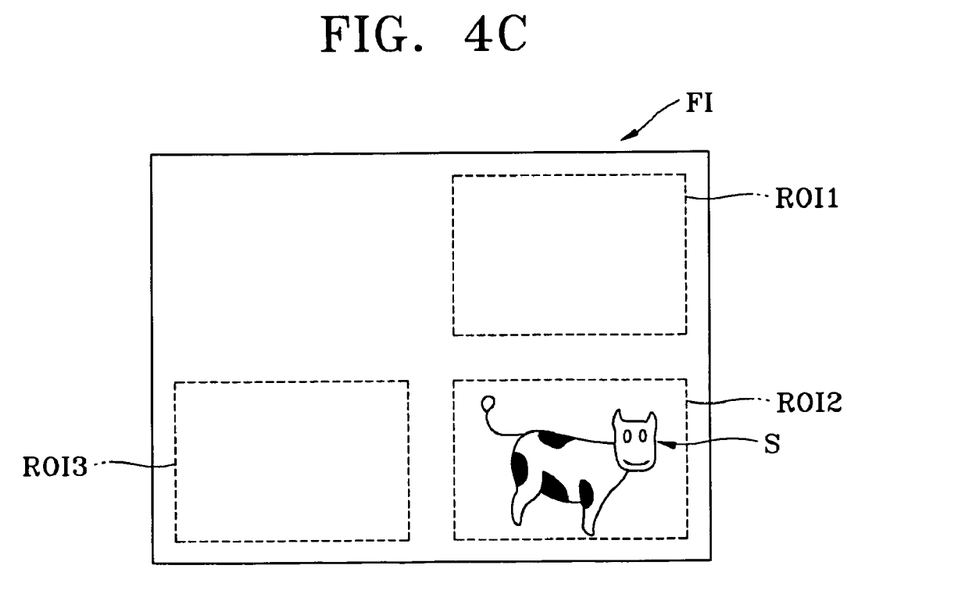
Figure 4D:
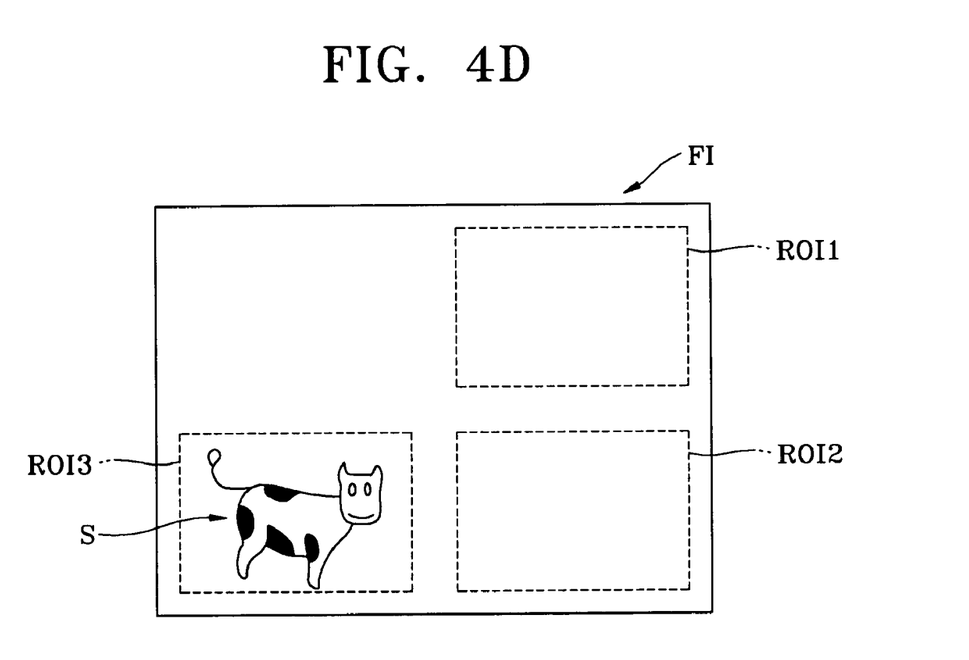

FIG. 4A is a conceptual diagram illustrating that a plurality of ROIs are set, and FIGS. 4B through 4D are conceptual diagrams illustrate positional relationships between the ROIs shown in FIG. 4A and the subject S on which the lens 10 is auto-focused.

Referring to FIG. 4A, a plurality of ROIs ROI1, ROI2, and ROI3, may be previously determined according to circumstances. In this case, when the subject S selected by the user is located in one of the ROIs ROI1, ROI2, and ROI3, data on a still image may be obtained. Also, as shown in FIGS. 4B through 4D, whenever the subject S selected by the user is located in one of the ROIs ROI1, ROI2, and ROI3 by moving the digital image photographing apparatus or the subject S selected by the user, data on the still image may be obtained.

Figure 5:
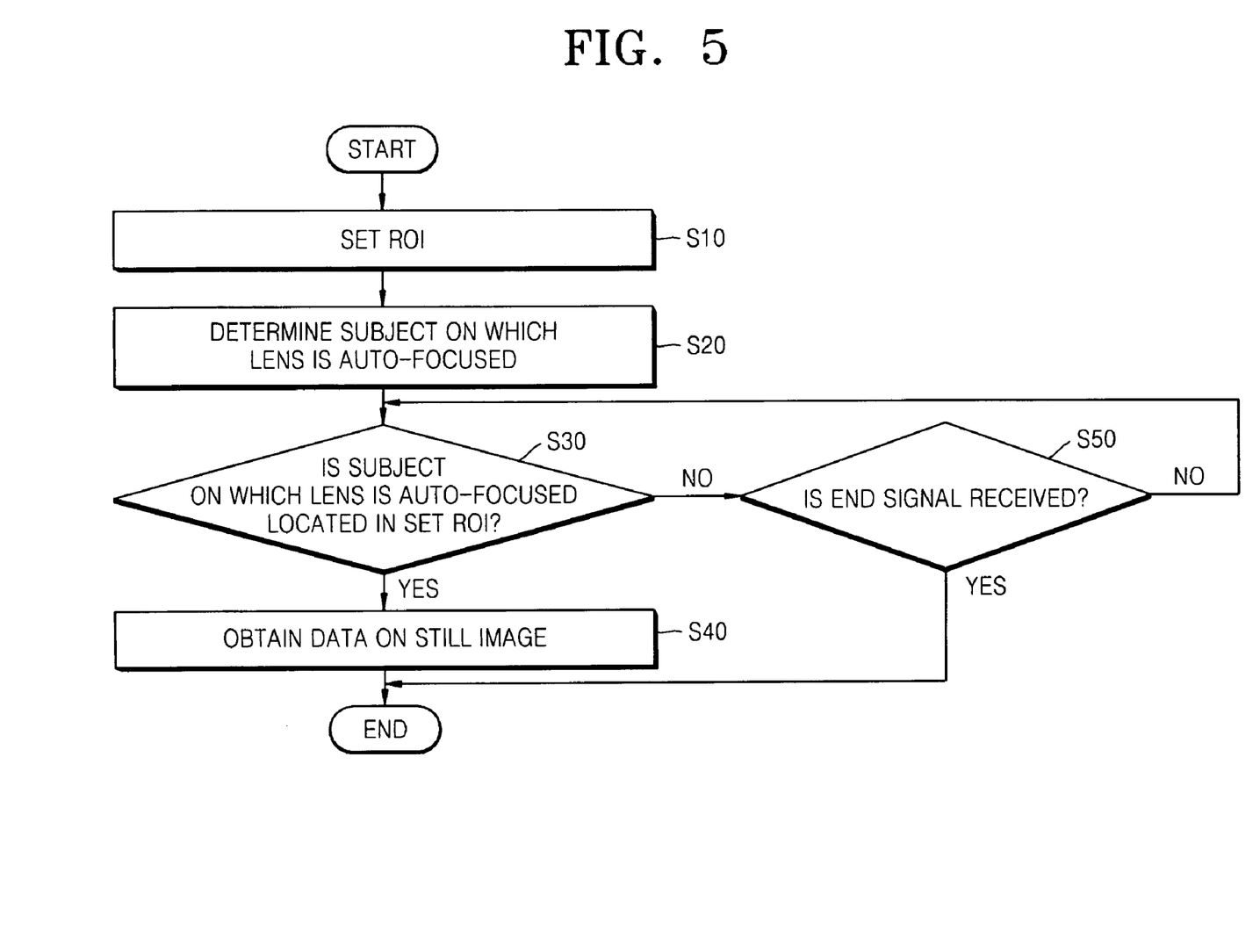
FIG. 5 is a flowchart of a method of controlling a digital image photographing apparatus according to an embodiment of the present invention.

FIG. 5 is a flowchart showing a method of controlling a digital image photographing apparatus, according to an embodiment of the present invention.

Referring to FIG. 5, the method may include setting an ROI in response to a signal input by a user in operation S10 and determining a subject on which a lens is auto-focused, in response to a signal input by the user in operation S20. Operations S10 and S20 may be performed in reverse order. In operation S20, for example, a subject located at an AFM when a shutter is half pressed may be determined as the subject on which the lens is auto-focused.

Thereafter, in operation S30, it is determined if the subject on which the lens is auto-focused is located in the set ROI. If the subject on which the lens is auto-focused is not located in the set ROI, the process proceeds to operation S50 of determining if an end signal is received from the user. If an end signal is received, the process comes to an end. If an end signal is not received, the process returns to operation S30 of determining if the subject on which the lens is auto-focused is located in the set ROI. If the subject on which the lens is auto-focused is located in the set ROI, data on a still image is obtained in operation S40, thereby capturing the still image as the user intends. In this case, the digital image photographing apparatus may be controlled such that the data on the still image is obtained when the center of the set ROI coincides with the center of the subject on which the lens is auto-focused.

Alternatively, the digital image photographing apparatus may be controlled such that the data on the still image is obtained when the subject on which the lens is auto-focused overlaps the set ROI by a predetermined rate or higher. Also, in the method according to the present embodiment, after operation S20, even if the location of the subject on which the lens is auto-focused is changed, the lens may continuously remain auto-focused on the subject.

In the method of controlling the digital image photographing apparatus according to the present embodiment, even if a user does not finally press a shutter, when a subject on which a lens is auto-focused is located in a predetermined ROI, data on a still image is automatically obtained. Thus, the resolution of the still image can be improved. Also, when photographing a subject moving rapidly, as long as the subject is located in a predetermined ROI, a still image of a composition intended by a user can be captured. Furthermore, when a user asks another person to photograph a subject, as long as the subject is located in a predetermined ROI, a still image of composition intended by a user can be captured.

In operation S10, a plurality of ROIs may be set. In this case, when the subject on which the lens is auto-focused is located in one of the ROIs, data on a still image can be obtained.

Figure 6:
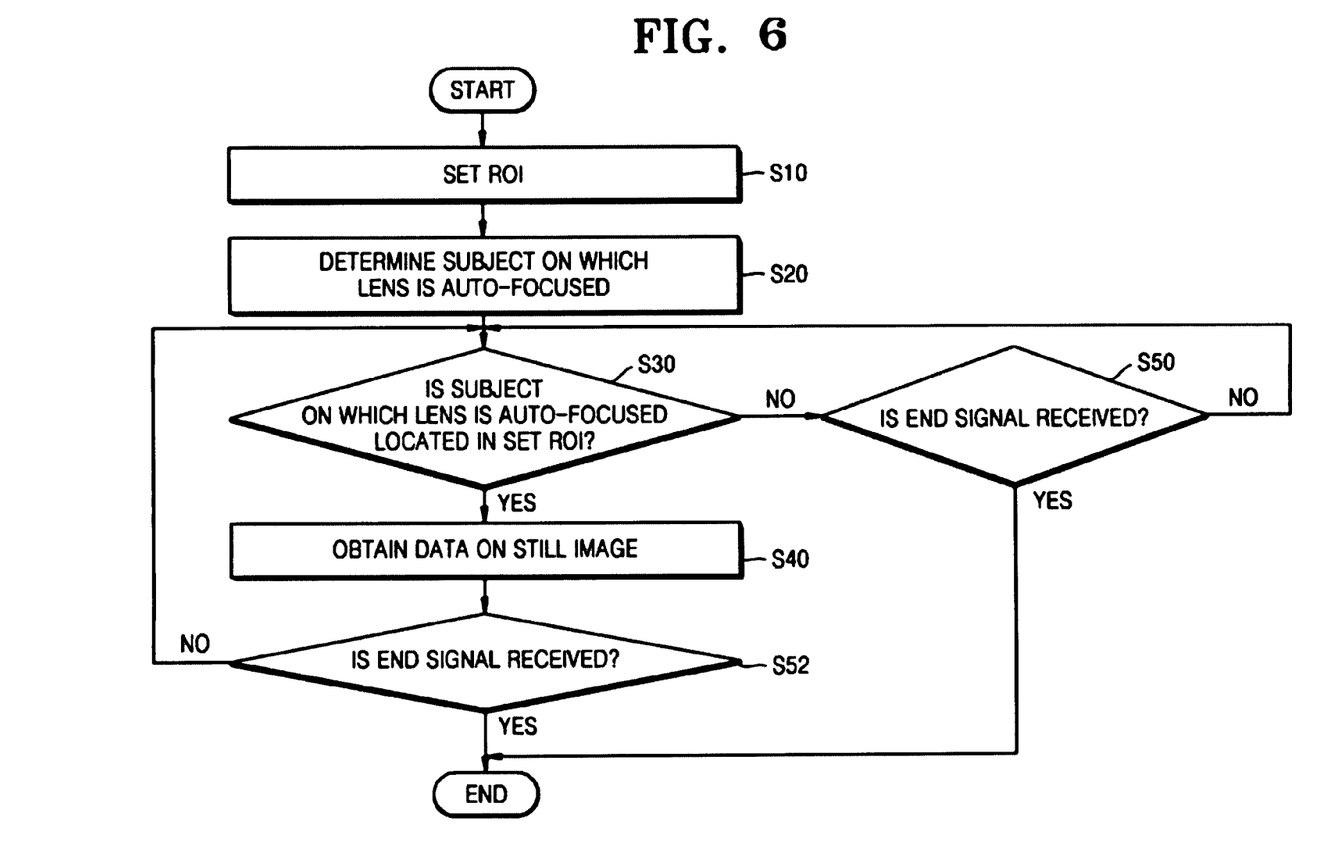
FIG. 6 is a flowchart of a method of controlling a digital image photographing apparatus, according to another embodiment of the present invention.
Figure 7:
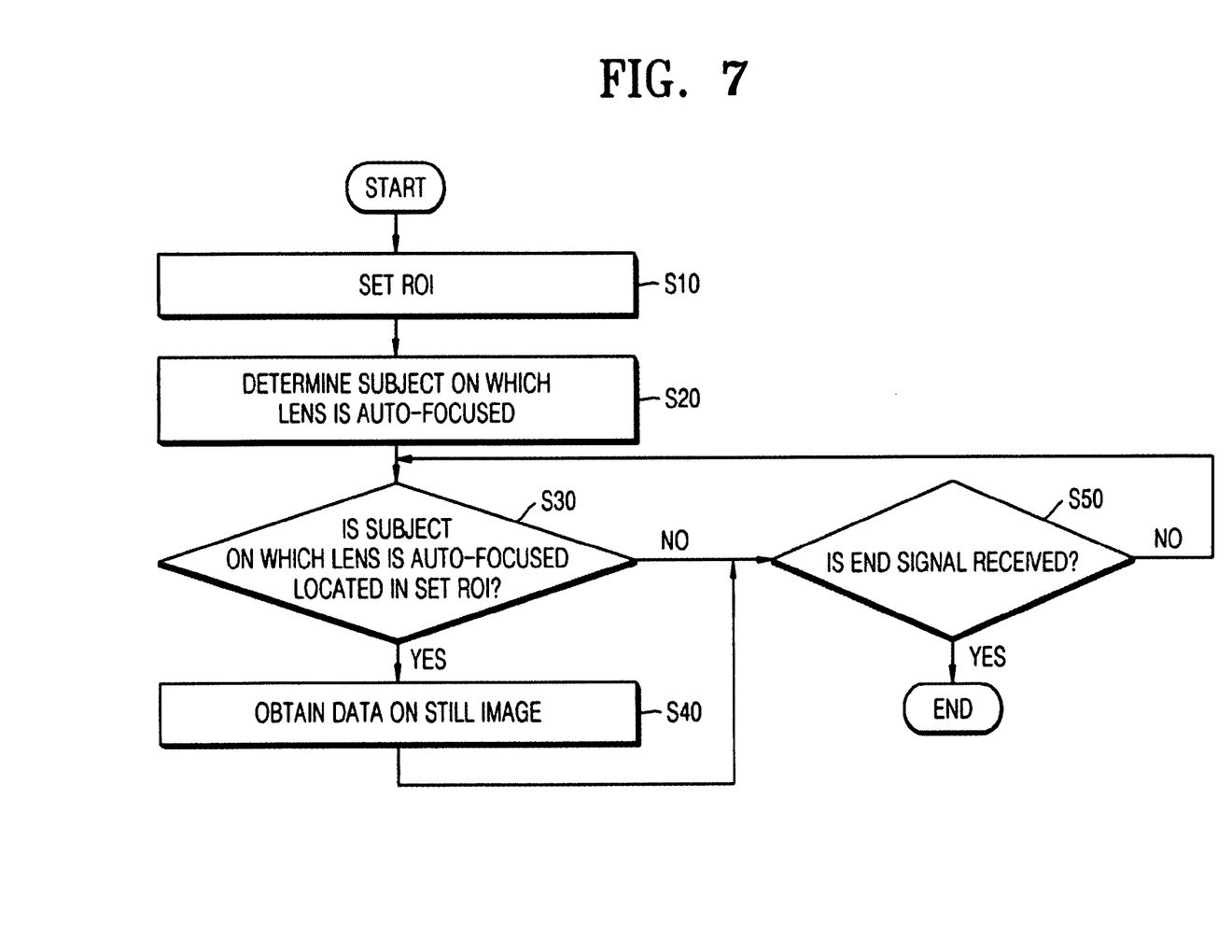
FIG. 7 is a flowchart of a method of controlling a digital image photographing apparatus, according to another embodiment of the present invention.

FIG. 6 is a flowchart showing a method of controlling a digital image photographing apparatus according to an embodiment of the present invention. The method shown in FIG. 6 is generally the same as the method shown in FIG. 5 except that when it is determined that the subject on which the lens is auto-focused is located in the set ROI in operation S30, operation S40 of obtaining the data on the still image is followed by operation S52 of determining if an end signal is received from the user. If an end signal is not received from the user, the process returns to operation S30 of determining if the subject on which the lens is auto-focused is located in the set ROI. The method shown in FIG. 6 may be performed when a single ROI is set and data on a still image is obtained each time the subject on which the lens is auto-focused is located in the single ROI. Alternatively, the method shown in FIG. 6 may be performed when a plurality of ROIs are set and data on a still image is obtained each time the subject on which the lens is auto-focused is located in one of the plurality of ROIs. Of course, the digital image photographing apparatus having the same functions may be controlled using a method shown in FIG. 7 in which operation S52 and operation S50 are combined.

A program for executing a method of controlling a digital image photographing apparatus according to the above-described embodiments of the present invention and variations thereof may be stored in a recording medium. Here, the recording medium may be the storage medium 70 shown in FIG. 1, the memory 60 shown in FIG. 1, or another recording medium. Examples of the recording medium may include magnetic storage media, such as read-only memories (ROMs), floppy disks, and hard disks, and optical readers, such as CD-ROMs and digital versatile discs (DVDs).

According to the present invention as described above, a digital image photographing apparatus capable of easily capturing an image of a composition intended by a user, a method of controlling the apparatus, and a recording medium having a program for executing the method are provided.

Any of the computational elements may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

What is claimed is:

1. A digital image photographing apparatus comprising:
an image capturing device that receives light and generates image data; and
an auto-focusing tracking unit that facilitates a lens to be auto-focused on a subject selected by a user,
wherein the image capturing device generates captured still image data when the subject on which the lens is auto-focused is located in a predetermined region of interest (ROI) that is distinct from an auto-focusing location of the auto-focusing tracking unit.

2. The apparatus of claim 1, wherein the auto-focusing tracking unit facilitates the lens to remain auto-focused on the subject selected by the user whether or not the location of the subject selected by the user is changed.

3. The apparatus of claim 1, wherein the image capturing device generates the captured still image data when the center of the predetermined ROI coincides with the center of the subject on which the lens is auto-focused.

4. The apparatus of claim 1, wherein the auto-focusing tracking unit recognizes a subject, which is located at an auto-focusing mark (AFM) when the user half presses a shutter, as the subject selected by the user.

5. The apparatus of claim 1, wherein a plurality of ROIs are previously set, and wherein, when the subject selected by the user is located in one of the previously set ROIs, the image capturing device generates the captured still image data.

6. The apparatus of claim 1, wherein a plurality of ROIs are previously set, and wherein whenever the subject selected by the user is located in one of the ROIs by moving the digital image photographing apparatus or the subject selected by the user, the image capturing device generates the captured still image data.

7. The apparatus of claim 1, wherein captured still image data is not obtained when the subject on which the lens is auto-focused is not located in the set ROI.

8. The apparatus of claim 1, wherein the image capturing device automatically generates captured still image data even when the user does not finally press a shutter.

9. The apparatus of claim 1, wherein a single ROI is previously set, and the image capturing device automatically generates the captured still image data each time the subject selected by the user is located in the single ROI.

10. A method of controlling a digital image photographing apparatus, the method comprising:
setting a region of interest (ROI) in response to a signal input by a user, the ROI being distinct from an auto-focusing location;
determining a subject on which a lens is auto-focused, in response to the signal input by the user; and
obtaining captured still image data when the subject on which the lens is auto-focused is located in the set ROI.

11. The method of claim 10, wherein, when the subject on which the lens is auto-focused is determined, the lens continuously remains auto-focused on the subject whether or not the location of the subject on which the lens is auto-focused is changed.

12. The method of claim 10, wherein the obtaining of the captured still image data is performed when the center of the set ROI coincides with the center of the subject on which the lens is auto-focused.

13. The method of claim 10, wherein the determining of the subject on which the lens is auto-focused comprises determining a subject, which is located at an auto-focusing mark (AFM) when the user half presses a shutter, as the subject on which the lens is auto-focused.

14. The method of claim 10, wherein the setting of the ROI comprises setting a plurality of ROIs, and the obtaining of the captured still image data is performed when the subject on which the lens is auto-focused is located in one of the plurality of ROIs.

15. The method of claim 10, wherein the setting of the ROI comprises setting a plurality of ROIs, and the obtaining of the captured still image data is performed whenever the subject selected by the user is located in one of the ROIs by moving the digital image photographing apparatus or the subject selected by the user.

16. The method of claim 10, wherein captured still image data is not obtained when the subject on which the lens is auto-focused is not located in the set ROI.

17. The method of claim 10, wherein the captured still image data is obtained automatically even when the user does not finally press a shutter.

18. The method of claim 10, wherein the setting of the ROI comprises setting a single ROI, and the obtaining of the captured still image data is performed each time the subject on which the lens is auto-focused is located in the single ROI.

19. A non-transitory computer-readable medium having embodied thereon a computer program for executing a method comprising:
setting a region of interest (ROI) in response to a signal input by a user, the ROI being distinct from an auto-focusing location;
determining a subject on which a lens is auto-focused, in response to the signal input by the user; and
obtaining captured still image data when the subject on which the lens is auto-focused is located in the set ROI.

* * * * *